United States Patent [19]

King

[11] Patent Number: 4,504,038
[45] Date of Patent: Mar. 12, 1985

[54] VALVE ACTUATOR

[76] Inventor: Ottis W. King, 8534 E. 24th St., Tulsa, Okla. 74129

[21] Appl. No.: 488,064

[22] Filed: Apr. 25, 1983

[51] Int. Cl.³ ............... F16K 31/122; F16K 31/126; F16K 31/528

[52] U.S. Cl. ......................................... 251/58; 74/57; 74/89; 92/31; 137/75; 251/61.4; 251/63.5; 251/229; 251/253

[58] Field of Search ............. 137/72, 75; 251/58, 251/229, 252, 61.4, 61.5, 63.5, 63.6, 14, 253; 92/31; 74/57, 89

[56] References Cited

U.S. PATENT DOCUMENTS

| | | | |
|---|---|---|---|
| 2,315,775 | 4/1943 | D'Arcey | 251/58 |
| 2,883,144 | 4/1959 | Kendig | 251/58 |
| 2,908,478 | 10/1959 | Starrett | 251/58 |
| 2,998,805 | 9/1961 | Usab | 251/58 |
| 3,035,609 | 5/1962 | Dyer | 137/75 |
| 3,046,802 | 7/1962 | Cupedo | 92/31 |
| 3,078,065 | 2/1963 | Vickery | 92/33 |
| 3,184,214 | 5/1965 | King | 251/252 |
| 3,198,539 | 8/1965 | McMullen et al. | 280/43.17 |
| 3,391,722 | 7/1968 | Ligh | 74/89 |
| 3,417,960 | 12/1968 | Stehlin | 251/58 |
| 3,450,382 | 6/1969 | Calim | 251/58 |
| 3,542,332 | 11/1970 | Chevalier et al. | 251/63.6 |
| 3,744,506 | 7/1973 | Milsted, Sr. | 137/72 |
| 3,982,725 | 9/1976 | Clark | 251/58 |
| 4,285,495 | 8/1981 | King | 251/63.5 |
| 4,316,597 | 2/1982 | Goodman et al. | 251/63.6 |

Primary Examiner—George L. Walton
Attorney, Agent, or Firm—Head, Johnson & Stevenson

[57] ABSTRACT

A valve operator having a piston or diaphragm and connected polygonal piston rod which supplies reciprocable motion to a key or follower which acts within a spiraled slot formed in a coupling member attached to a valve gate to rotate the valve gate to a desired angular position. One embodiment includes means to bias the piston and the valve gate in a desired angular position from closed to open or therebetween.

7 Claims, 2 Drawing Figures

VALVE ACTUATOR

SUMMARY OF THE INVENTION

This invention relates to a valve operator. More particularly, the invention relates to a novel type of mechanism for rotating the gate member of a valve. In one embodiment the invention relates particularly to a valve actuator for rotating the gate member of a valve, such as is found in the butterfly or plug valve, wherein the gate member is rotated through approximately 90° from full open to full closed position, providing a means for rotating such gate member through such 90° by the rotation of a handwheel wherein the handwheel is rotated through substantially more than 90° to rotate the gate member through such 90°. In another embodiment the invention relates particularly to a valve operator adapting a valve for use with a hydraulic or pneumatic valve actuator wherein the operator converts linear movement from the actuator to rotary movement for rotation of the valve gate member to open or close the valve.

Many types of valves utilized in industry include a gate member which is actuated to open or close a fluid stream port through the body of the valve. Examples of such types of valves include the butterfly valve and the plug valve. In the butterfly type valve a substantially flat disc serves as the gate member. The disc is hinged in the center of the valve on a shaft or stem which extends perpendicular to the axis of the passageway through the body of the valve. The stem is rotated to close the passageway when the disc extends substantially perpendicular to the longitudinal axis of the passageway and to provide passageway through the valve when the disc is rotated approximately 90° so that the disc is parallel to the longitudinal axis of the valve passageway. The most common type of device now used to rotate the disc in a butterfly valve is a lever positioned exterior of the valve. This arrangement is completely satisfactory for smaller type valves which can be manually opened easily by use of a lever and especially when the valves are utilized in an application where they will normally be either full open or full closed. The provision of a lever does not adapt a valve for use as a throttling valve wherein the gate member is stopped at a position somewhere intermediate the full open and full closed position. When a lever is used as the means of controlling the position of the gate member, there is no means of maintaining the valve in a predetermined position. In addition, providing necessary leverage for manually opening and closing a large valve, or a valve which is under high pressure, can be accomplished only by unduly extending the length of the lever handle.

This invention may be defined as a valve operator. More particularly, but not by way of limitation, the invention may be defined as a valve operator for use with a valve having a fluid passageway therethrough and a valve gate member rotatably positioned in said passageway, said gate member adaptable to close said passageway in one angular position relative to said passageway and to open said passageway when rotated to a different angular position, said valve having a stem member to which said gate member is supported and rotated, said valve operator adaptable to rotate said stem member and thereby said valve gate member, said valve operator comprising, in combination: a tubular housing is divided into lower and upper cylindrical spaces. A transverse portion having a polygonal shaped opening that is coincident with the axis of said valve stem separates the lower and upper cylindrical spaces. A tubular coupling member is rotatably positioned in the lower cylindrical space and is affixed to the valve stem and gate. Thus rotation of the coupling rotates the valve gate. A free piston or a diaphragm type piston is sealed with respect to the upper cylindrical space and is reciprocable therein. A piston rod is attached to one, or the lower side of the piston and is of the same polygonal shape as said opening yet is reciprocable therein. The piston rod extends into the lower cylindrical space and telescopically into the coupling member. A key or follower pin affixed to the piston rod extends into one or more spiral slots or cam-like surfaces formed as a part of the coupling member to convert the longitudinal or reciprocable motion of the piston and piston rod into rotary motion of the coupling member. Pressure fluid, pneumatic or hydraulic is introduced into or withdrawn from one or both sides of the piston to cause the reciprocation. A spring or other means operable against the piston will cause the valve gate to be biased to a given angular position, from open to closed of ir need be to any position therebetween. A means such as a heat destructive (fusible) plug on one or both sides of the piston acts to return the valve gate to the biased position for safety purposes.

DETAILED DESCRIPTION OF THE PREFERRED EMBODIMENT

Before explaining the present invention, in detail, it is to be understood that the invention is not limited in its application to the details of construction and arrangement of parts illustrated in the accompanied drawings, since the invention is capable of other embodiment and being practiced or carried out in a variety of ways. Also, it is to be understood that the phraseology or terminology employed herein is for the purpose for description and not of limitation.

Figure 1:
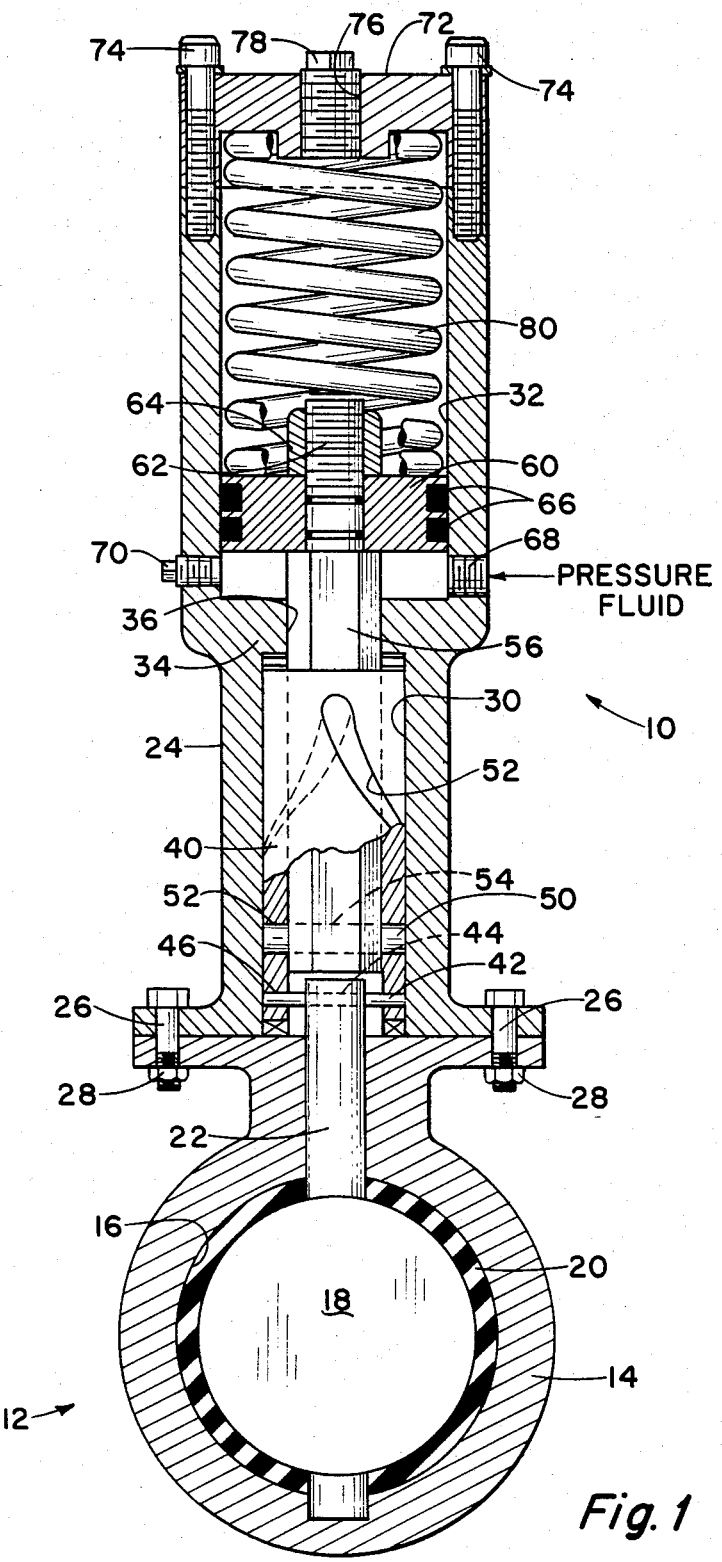
FIG. 1 is a cross-sectional view of a butterfly-type valve with the operator of this invention affixed to the valve, the cross-sectional view taken perpendicularly to the longitudinal axis of the fluid passageway through the valve.

Referring now to the drawings, and first to FIG. 1, the valve operator of this invention is shown adapted to a typical butterfly type valve. The valve operator is indicated generally by the numeral 10 and the valve is indicated generally by the numeral 12. Valve 12, a typical butterfly type valve, consists of a body 14 through which is formed a cylindrical fluid passage 16. Interposed in the fluid passage 16 is a rotory positioned valve gate member 18. The gate member may include, for efficiency of closure, a resilient seal member 20 supported around the periphery. The gate member 18 is pivotably supported by an axial member or stem 22 by which the gate member 18 is opened and closed. Gate member 18 is shown in the full closed position so that the seal member 20 engages the total internal diameter of fluid passage 16 to prevent flow of fluid through the valve 12. When stem 22 is rotated 90° from the position shown in FIG. 1, the disc gate member 18 is then parallel relative to the longitudinal axis of fluid passage 16 so that fluid may pass through the valve 12. Thus, the typical butterfly valve 12 is moved from full opened to full closed position by the rotation of stem 22 through approximately 90°.

Stem 22 extends, at one end thereof and in this case the upper end, beyond the body 14 of the valve to provide a means whereby the gate member may be rotated. The typical means of rotating stem 22, and thereby the gate member 18, is by affixing to the exposed portion of the stem 22 a lever (not shown). The valve operator 10 of this invention replaces the lever to perform the function of the rotation of stem 22 to open and close valve 12.

Valve operator 10 consists basically of a tubular operator housing 24 which, by way of example, is flanged and supported to valve body 14 with bolts 26 and nuts 28. Housing 24 is divided into a lower cylindrical space 30 and an upper cylindrical space 32, the axes of which coincide with the axis of the valve stem 22. The spaces 30 and 32 are separated by a transverse portion 34 which has an axial polygonal shaped opening 36 therethrough.

Rotatably supported in the lower portion of operator housing 24 is a tubular opening coupling member 40. Coupling member 40 receives the valve stem 22 of valve 12 extending beyond the body 14 of the valve. By means of a key 42 positioned in an opening 44 in the valve stem 22 and opening 46 in the coupling member 40, the coupling member 40 and stem 22 are coupled together.

Slots 52 are each spiraled through 90° of the circumference of coupling member 40. Spiral slots 52 are formed diametrically of each other through 90° of the circumference of each side of coupling member 40. Key 50, which extends through slots 52 and through opening 54 in the piston rod 56, always extends perpendicular to the longitudinal axis of the tubular coupling member 40. It can be seen that the operator of the invention would function with only one slot 52 formed in one side of coupling member 40, in which case key 50 would extend to only one side of nut member 40 to enter the single spiraled slot 52. Or, there may be three or more spiraled slots 52 formed around the sides of coupling member 40 with a key 50 extending from piston rod 56 into each of the spiraled slots 52.

Piston rod 56 is polygonal, e.g. hexagon, shaped to match and reciprocate within opening 36 and extends from its attached piston 60 in the upper cylinder 32 through opening 36 and into coupling member 40 to where piston rod 56 is connected therewith via key 50 as previously described. The piston rod 56 may be connected to piston 60 as by a threaded end 62 and nut 64. The piston 60 includes seal rings 66. Opening 68 is provided below the piston 60 for connection with a fluid pressure source. A fusible plug 70 is provided which in the event of a fire or excess heat will relieve the pressure below the piston.

Above the piston 60 the cylinder 32 is closed by a cap 72 held by threaded connectors 74. An opening 76 is provided which may either be used to supply or return pressure fluid and thus be a double acting operator to reciprocate piston 60. In the embodiment show a spring 80 is positioned between the cap 72 and piston 60 which biases the valve gate 18 to be closed. A plug 78, which also may be fusible, closes opening 76.

Figure 2:
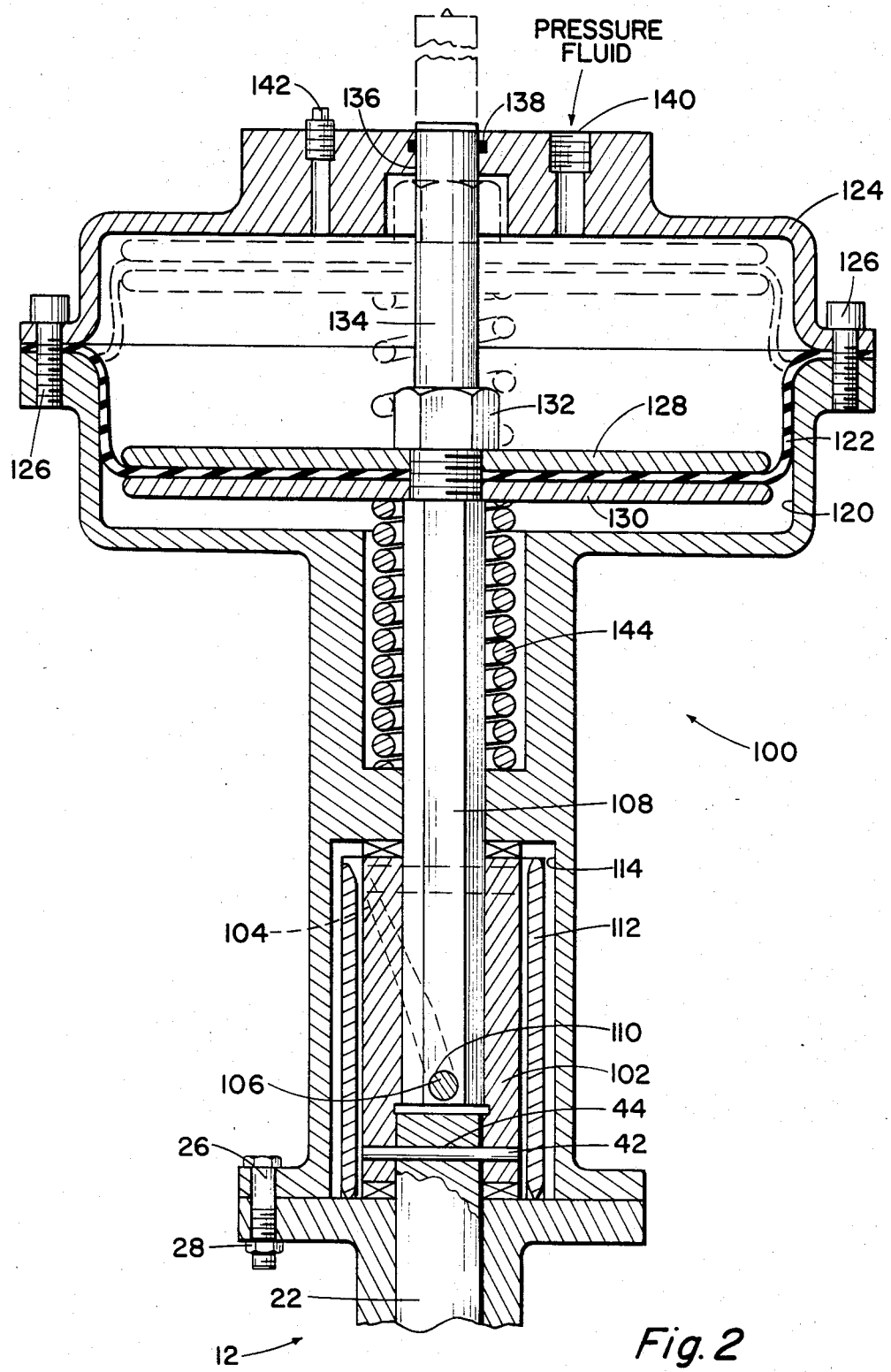
FIG. 2 is a partial sectional view of another type of valve operator with the valve omitted.

Another embodiment of a valve operator, generally designated 100, is shown in FIG. 2 connected to valve 12 of which only a top portion is shown. The valve stem 22 is connected to a coupling member 102 by key or shaft 42 similarly shown in FIG. 1. The coupling member 102 includes one or more spiral slots 104 which receive key or follower pin 106. Key 106 interconnects with hexagonal piston rod 108 through opening 110 and thus converts reciprocating motion of piston rod 108 into rotary motion of coupling 102 and connected valve stem 22. A guide bushing 112 is positioned in lower cylinder space 114. An upper cylindrical space 120 includes a diaphram 122 retained by a cover 124 held by threaded connectors 126. Upper and lower plates 128 and 130 sandwich diaphragm 122 therebetween and are held to piston rod 108 by threaded nut 132. The upper part 134 of the piston rod is round and extends above cover 124 through opening 136 which includes o-ring or seal 138. The upper part 134 may include suitable indicia, not shown, which will indicate the position of the valve. Opening 140 is provided to connect with a pressure fluid, e.g. air supply. A fusible plug 142 is also provided as a safety means. In this embodiment, a spring 144 is provided below the piston plate 130 to bias the piston upwardly, which for example would cause the valve gate to close in the event of a loss of pressure fluid or fire. Of course, it is to be understood that the operator could be designed to maintain the valve gate open as would be necessary for a given use.

In the operation of both devices of FIGS. 1 and 2 reciprocatable movement of the piston rod 56 or 108 is converted to rotary motion of respective coupling members 40 or 102 by reason of key 50 or 106 operating in spiral slots 52 or 104. The rotary motion being then transferred to valve stem 22 to open or close valve gate 18, or otherwise angularly position same relative to the connected flow line.

What is claimed is:

1. A valve having a valve body with a fluid passageway therethrough and a valve gate member rotatably positioned in said passageway, said gate member adaptable to close said passageway and to open said passageway when rotated to a different angular position, a stem member to which said gate member is supported and rotatably connected, an operator arranged to rotate said stem member and thereby said valve gate member, said valve operator comprising, in combination:

a tubular operator housing supported at one end thereof on said valve body with the tubular axis of said housing coincident with the axis of said valve stem member, said tubular housing being divided into lower and upper cylinders by a transverse portion, said transverse portion having a polygonal shaped opening coincident with said axis of said valve stem member;

a tubular coupling member rotatably positioned in said tubular housing in said lower cylinder thereof adjacent said valve body, said coupling member being affixed to said stem member whereby the rotation of said coupling member rotates said stem member and thereby said valve gate member, said coupling member having at least one elongated spiraled slot formed in the sidewall thereof;

a piston sealed relative to said upper cylinder and reciprocatable therein;

a piston rod attached at its upper end to the lower side of said piston, said piston rod being of cross-section substantially the same as and reciprocatable in said polygonal shaped opening, said piston rod having a portion thereof telescopically extending within said coupling member, said piston rod being supported in a torque resisting non-rotatable and axially displaceable manner in said operator housing transverse portion and the lower portion thereof being telescopically received in said tubular coupling member;

key means affixed to said piston rod extending into each of said spiraled slots formed in said coupling member whereby longitudinal movement of said piston and piston rod relative to said coupling member rotates said coupling member and thereby said valve gate member;

means to close the top of said upper cylinder, said housing being closed in its entirety from ambient environment; and means to supply or remove pressure fluid into or from the said cylinder space above and below said piston to cause reciprocation thereof.

2. A valve according to claim 1 including means to bias said piston and said valve gate member in a given angular position.

3. A valve according to claim 2 wherein said means to bias maintains said valve normally open to flow.

4. A valve according to claim 2 wherein said means to bias maintains said valve normally closed to flow.

5. A valve according to claim 2 including emergency means to permit said valve gate member to return to said given angular position.

6. A valve according to claim 5 wherein said emergency means includes plug means actuatable at a given temperature extreme.

7. A valve according to claim 1 wherein said piston is a diaphram type.

* * * * *